Oct. 25, 1966   G. F. BREMER   3,280,684
DEVICE FOR FABRICATING COMPOSITE CONTRAST
COLOR EMBOSSED DISPLAYS
Filed Feb. 2, 1965   2 Sheets-Sheet 1

INVENTOR
GEORG F. BREMER
BY *Samuelson & Jacob*
HIS ATTORNEYS

INVENTOR
GEORG F. BREMER
BY Samuelson & Jacob
HIS ATTORNEYS

United States Patent Office 3,280,684
Patented Oct. 25, 1966

3,280,684
DEVICE FOR FABRICATING COMPOSITE CONTRAST COLOR EMBOSSED DISPLAYS
Georg F. Bremer, Albany, Calif., assignor to Dymo Industries, Inc., Emeryville, Calif., a corporation of California
Filed Feb. 2, 1965, Ser. No. 429,709
14 Claims. (Cl. 83—522)

The present invention relates generally to the manufacture of composite contrast color embossed displays and pertains, more specifically, to a device for fabricating such composite displays.

It is now well known that a contrast color embossment may be provided in certain sheeted thermoplastic resins by means of cold forming methods such as cold drawing, or embossing cold material in cold dies. In this manner, plastic displays such as labels, signs, plates, badges, tags, etc. having contrasting color embossments are provided quickly, conveniently and without complex or expensive equipment.

The plastic sheet materials which are generally employed in the manufacture of such articles are usually relatively thin and most frequently have a substantially uniform background color upon which the contrast color lettering or enfigurement is embossed.

While displays fabricated of such materials have proved quite acceptable, it has been found that displays having greater aesthetic appeal can be derived from the use of such materials and techniques by affixing the embossed plastic sheet to a second plastic sheet, or backing strip, having a color contrasting with the background color of the first sheet. By making the second sheet somewhat larger in area than the first sheet, a border of contrasting color can be provided around the first sheet. The effect is enhanced by providing a second sheet of relatively greater thickness than the first sheet and beveling the peripheral edges thereof. If the second sheet has a contrasting color throughout its thickness, such beveling will produce a beveled margin of contrasting color and establish an aesthetically appealing frame around the perimeter of the first sheet. The assembled first and second sheets thus form a composite contrast color embossed display.

It is therefore an important object of the invention to provide a device for facilitating the fabrication of a composite contrast color embossed display.

Another object of the invention is to provide a device for facilitating the collection and assembly of first and second plastic sheets in a composite contrast color embossed display.

Still another object of the invention is to provide a device for severing a plastic sheet of predetermined width and indeterminate length to produce a backing strip of any desired length with a beveled margin at the severed edge.

A further object of the invention is to provide a device as described above wherein means are provided for visually accurately determining the location at which the severed edge and beveled margin will be produced.

A still further object of the invention is to provide a device as described above comprised of a minimum number of readily fabricated and assembled parts.

Another object of the invention is to provide a device as described and which is easily operated to produce accurate results of consistently high quality.

The invention may be described briefly as a device for severing a plastic sheet of predetermined width and indeterminate length to produce a backing strip of any desired length with beveled margins at the peripheral edges thereof. The device comprises frame means, an arm journaled for pivotal movement relative to the frame means between first and second positions, means in the arm for receiving a length of the plastic sheet and aligning the length in relation to the arm, a cutting blade fixed in the frame means at such an angular relationship to the arm and at such a transverse relationship to the sheet receiving and aligning means as to assure that pivotal movement of the arm from the first position to the second position will move the receiving and aligning means toward the blade so that the blade will sever the plastic sheet carried in said means at an angle and simultaneously establish a beveled margin at the severed edge. Further means may be provided for visibly locating the plastic sheet within the sheet receiving and aligning means in relation to the cutting blade. In addition, the invention contemplates the provision of means for collocating an embossed plastic sheet with the beveled margined plastic sheet for assembling a composite contrast color embossed display having a background color with an embossment thereon of contrasting color and a frame of contrasting color around the background color.

The invention will be more fully understood and additional objects and advantages will become apparent in the following detailed description of an embodiment of the invention illustrated in the accompanying drawings, in which.

Figure 1:
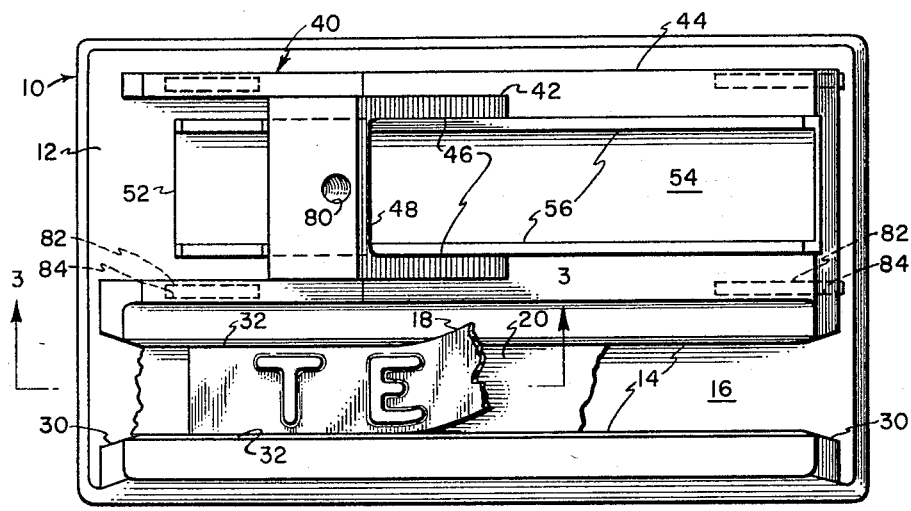
FIGURE 1 is a plan view of a device constructed in accordance with the invention.
Figure 2:
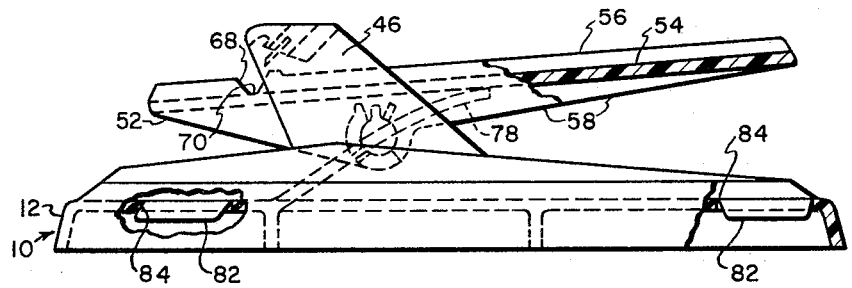
FIGURE 2 is a side elevational view of the device of FIGURE 1.
Figure 3:
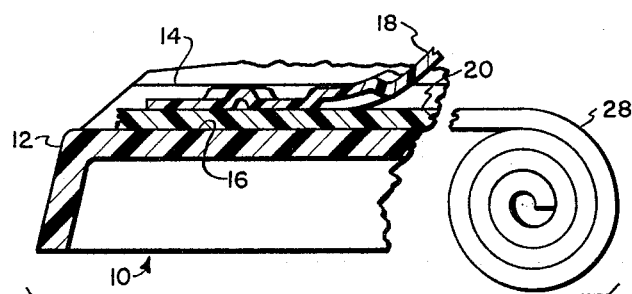
FIGURE 3 is an enlarged fragmentary cross-sectional view taken along line 3—3 of FIGURE 1.

Referring first to FIGURES 1 through 4, a device for fabricating a composite contrast color embossed display is designated generally at 10. A base plate 12 is provided with vertically projecting side walls 14 extending longitudinally and spaced horizontally to establish a track 16 for receiving and collocating a contrast color embossed first plastic sheet 18 with a second plastic sheet, illustrated in the form of a backing strip 20, and facilitating assembly of the first and second sheets into a composite contrast color embossed display.

Figure 4:
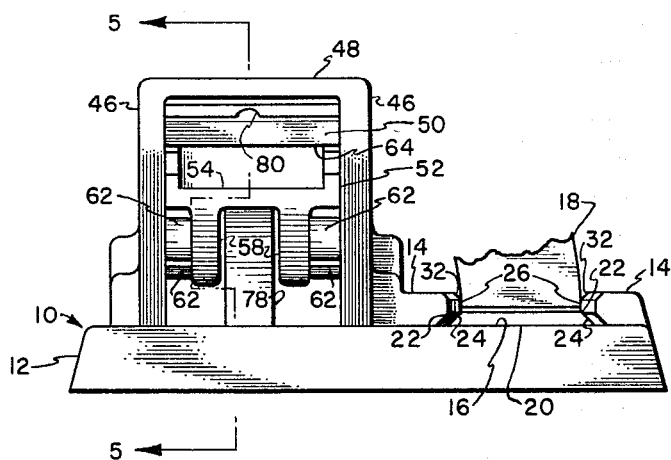
FIGURE 4 is a front elevational view of the device.

As best seen in FIGURE 4, backing strip 20 has beveled margins 22 along longitudinal edges thereof and, in order to effectively locate and hold the backing strip 20 in position for assembly, side walls 14 are now provided with complementary beveled portions 24. The embossed plastic sheet 18 may be guided into position upon the backing strip 20 by vertical portions 26 of the side walls 14, which portions are complementary to the longitudinal edges of plastic sheet 18. The first and second plastic sheets may thus be joined together in proper lateral registration in the finished assembly, generally by means of an adhesive placed between the sheets. While the first plastic sheet 18 is already embossed and cut to length prior to assembly with the backing strip 20, the second plastic sheet is usually supplied in an indeterminate length, as represented by the roll 28 illustrated in FIGURE 3, and must be trimmed and severed to establish the completed assembly with a backing strip 20 having a beveled margin along the entire peripheral edge thereof and embossed plastic sheet 18 fixed to the backing strip 20 in longitudinal registration as well as in lateral registration. The side walls 14 are flared at either end 30 to facilitate the entry of the second plastic strip into track 16. Likewise, the side walls 14 are provided with a beveled edge 32 along their length to ease the entry of the embossed plastic sheet 18 into lateral registration with the second plastic strip 20.

In order to sever the second plastic sheet and form a backing strip 20 of required length and to trim the lateral edges of the backing strip 20 to establish beveled margins matching the beveled margins along the longitudinal edges, device 10 is provided with a cutting mechanism designated in the figures generally at 40. Cutting mechanism 40 has a stationary frame 42 provided with a generally horizontal basal support member 44, a pair of horizontally spaced support members 46 projecting vertically therefrom and a beam member 48, also disposed generally horizontally, interconnecting the vertical extremities thereof. The location of beam 48 remote from basal support 44 establishes an opening 50 through which passes an arm 52.

Figure 5:
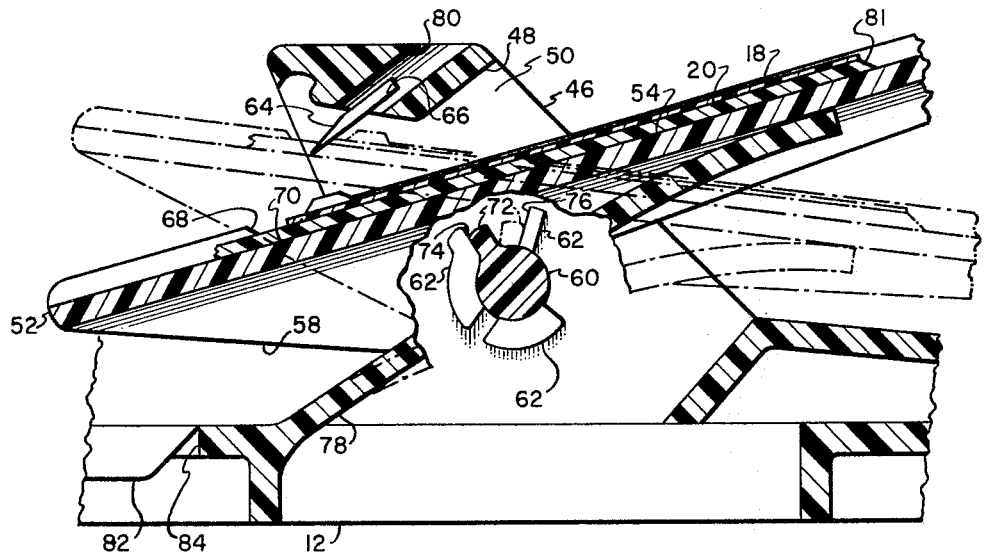
FIGURE 5 is an enlarged cross-sectional view taken along line 5—5 of FIGURE 4 and illustrating two positions of operation.

The first and second plastic sheets, having been assembled in track 16, are received within a channel 54 provided in arm 52 and aligned by longitudinal side walls 56 of the channel 54 to lie along the length of arm 52 with beveled margins 22 adjacent side walls 56 and the embossed plastic sheet 18 facing uppermost, as seen in FIGURE 5. In addition to channel 54, which extends lengthwise along the uppermost surface of arm 52, the arm 52 is provided with downwardly depending skirts 58, each of which has an axle 60 projecting outwardly therefrom (see FIGURE 5). Each axle 60 is journaled within bearing blocks 62 which project inwardly from each vertical support member 46 (see FIGURE 4) so that arm 52 may be pivoted relative to stationary frame 42 for purposes which will now be explained.

The actual severing and trimming of the second plastic sheet to establish a beveled margin at the severed edge is accomplished by a cutting blade 64 fixed within a slot 66 in beam 48. The cutting blade 64 thus lies above channel 54 and extends transversely of the channel 54 completely across the lateral width thereof. Hence, it is seen that pivotal movement of the arm 52 will move the channel 54 relative to cutting blade 64. Side walls 56 of the channel 54 are notched at 68 to establish an anvil portion at 70 which can be brought into cooperative engagement with the cutting edge of blade 64 by pivotal movement of the arm 52 as seen in phantom in FIGURE 5. The cutting blade 64 projects downwardly toward arm 52 at an angle relative to channel 54, the angle being chosen so that pivotal movement of arm 52 as described above will cause cutting blade 64 to sever the second plastic sheet 20 at an angle and thus establish a lateral beveled margin at the severed edge simultaneous with the severing of the second plastic sheet 20.

Arm 52 is journaled by means of axles 60 and bearing blocks 62 for movement between a first position, shown in full lines in FIGURE 5, and a second position, illustrated in phantom in the same figure. When the arm 52 is in the first, or open position, the assembled plastic sheets may be placed within channel 54. Upon movement of arm 52 to the second position, the second plastic sheet 20 is severed. Because movement of the arm 52 beyond the second position, at which position the cutting blade 64 cooperates with the anvil 70 to sever the backing strip 20, could damage the cutting edge of the blade, means are provided for positively limiting such movement to preclude rotation of the arm 52 beyond the second position. Thus, a lobe 72 projects radially from each axle 60 and stop shoulders 74 and 76 are provided upon appropriate bearing blocks 62 to limit the rotation of the axles 60 to the angle included between the stop shoulders 74 and 76 and preclude movement of the arm 52 in a counterclockwise direction (as viewed in FIGURE 5) beyond the first position where lobe 72 abuts shoulder 74 and in a clockwise direction beyond the second position where lobe 72 abuts shoulder 76.

To simplify operation of the cutting mechanism 40, means are provided for biasing the arm 52 in a counterclockwise direction, such means being shown in the form of a leaf spring 78 which tends to maintain the arm 52 at the first position and ready for movement to the second position.

Since the backing strip 20 is simultaneously severed and trimmed by the cutting blade 64 after the embossed plastic sheet 18 is affixed thereto and the embossed plastic sheet 18 has already been cut to the desired length prior to its being affixed to the backing strip 20, the assembled first and second plastic sheets should be placed in channel 54 in such a longitudinal position as to allow the cutting edge of blade 64 to establish a beveled margin in the second plastic sheet 20 at the edge of the first plastic sheet 18. The accomplishment of the proper longitudinal location of the sheet assembly is aided by the provision of aperture 80 in beam 48, which aperture 80 allows a visual sighting through the beam 48 along cutting blade 64 and visual alignment of the end of plastic sheet 18 with the cutting edge of the blade 64 just prior to the actual cutting operation. It will be noted that the assembled first and second plastic sheets 18 and 20 must be placed with channel 54 first with one end of plastic sheet 18 aligned with cutting blade 64 and, after a severing and trimming operation at that end, the assembled sheets must be removed and reversed, end for end, to align the second end of plastic sheet 18 for a second trimming operation. Thus, FIGURE 5 illustrates assembled plastic sheets 18 and 20 aligned for a second trimming operation, the initial severing and trimming operation already having been performed to produce beveled margin 81.

The above described construction lends itself to ready fabrication in the minimum number of component parts. Thus, base plate 12 would constitute one component part, while frame 42 would be a second component part and arm 52 and cutting blade 64 third and fourth parts, respectively. With the exception of the cutting blade 64, all of the component parts are readily molded of a synthetic resin material. While several such synthetic resin materials would be apparent to those skilled in the art of materials, one suitable material is nylon and it will be assumed, without limitation, that nylon is the material employed in the described embodiment.

As shown, the leaf spring 78 is molded integral with base plate 12. Frame 42 is held in assembled relationship with base plate 12 by means of tabs 82 depending from basal support member 44 and entering slots 84 to be locked therein by the angled configuration of the tabs, the assembled base plate 12 and the basal support member 44 establishing a horizontal base member upon which device 10 is supported. Axles 60 may be snapped into rotational engagement with bearing blocks 62 to complete the assembly. Leaf spring 78 will then project upwardly between skirts 58 of arm 52 to bias the arm 52 into the open position.

It is to be understood that the above detailed description of an embodiment of the invention is provided by way of example only. Modification of details of design or construction may be accomplished without departing from the true spirit and scope of the invention as set forth in the appended claims.

What is claimed is:

1. A device for fabricating a composite contrast color embossed display, which display includes assembled first and second plastic sheets secured to one another, the first plastic sheet having a background color with an embossment thereon of contrasting color and the second sheet having beveled margins along the peripheral edges thereof, the beveled margins providing a frame of contrasting color around the perimeter of the first sheet, said device comprising:

frame means;

an arm journaled for pivotal movement relative to said frame means between first and second positions;

means in said arm for receiving a length of said second plastic sheet and aligning said length in relation to said arm;

a cutting blade in said frame means at such an angular relationship to said arm and at such a transverse relationship to said sheet receiving and aligning means as to assure that pivotal movement of said arm from the first position to the second position will move said sheet receiving and aligning means toward said blade so that the blade will sever the second plastic sheet, when carried in said means, at an angle and simultaneously establish a beveled margin at the severed edge; and means cooperating with said frame means for holding the second plastic sheet and guiding the first plastic sheet into assembled relationship therewith.

2. A device of claim 1 wherein the last said holding and guiding means includes a longitudinal track having beveled side wall portions complementary to beveled margins along longitudinal edges of said second plastic sheet, and immediately adjacent further side wall portions complementary to longitudinal edges of said first plastic sheet.

3. A device of claim 1 including means for visually locating said assembled first and second plastic sheets within said sheet receiving and aligning means in relation to said cutting blade.

4. A device for fabricating a composite contrast color embossed display, which display includes assembled first and second plastic sheets secured to one another, the first plastic sheet having a background color with an embossment thereon of constrasting color and the second sheet having beveled margins along the peripheral edges thereof, the beveled margins providing a frame of contrasting color around the perimeter of the first sheet, said device comprising:

a horizontal base member;

a pair of horizontally spaced support members projecting vertically from said base member;

a generally horizontal beam member interconnecting said support members remote from said base member and establishing an opening bounded by the base, beam and support members;

an arm passing lengthwise through said opening and including an anvil portion;

a channel extending lengthwise along the uppermost surface of said arm including said anvil portion and having a width capable of receiving a length of the second plastic sheet and aligning said length along the length of said arm;

a cutting blade fixed in the beam member above said anvil portion, said blade projecting downwardly at an angle to the vertical and extending transversely of said channel such that pivotal movement of the arm from said first position to said second position will move said anvil against said blade and the blade will sever the second plastic sheet, when carried in the channel, at an angle and simultaneously establish a beveled margin at the severed edge; and means in said base member for holding the second plastic sheet and guiding the first plastic sheet into assembled relationship therewith.

5. A device of claim 4 wherein the last said holding and guiding means comprises a horizontal longitudinal track having vertical side walls including first side wall portions beveled complementary to beveled margins along longitudinal edges of said second plastic sheet, and immediately adjacent second side wall portions complementary to longitudinal edges of said first plastic sheet.

6. A device of claim 4 including an aperture in said beam member aligned with the angle of said cutting blade for permitting sighting along the blade and visual location of said assembled first and second plastic sheets within said channel in relation to the cutting blade.

7. A device of claim 4 including means biasing said arm toward said first position.

8. A device of claim 7 wherein said base member is molded of a synthetic resin and said biasing means comprises a leaf spring molded integral with at least a portion of said base member.

9. A device for severing a plastic sheet of predetermined width and indeterminate length to produce a backing strip of any desired length with beveled margins at the peripheral edges thereof, said device comprising:

frame means;

an arm journaled for pivotal movement relative to said frame between first and second positions;

anvil means carried by said arm;

means in said arm for receiving a length of said plastic sheet and aligning said length in relation to said arm and said anvil means; and a cutting blade in said frame means located vertically above the anvil means and at such an angular relationship to said arm and said anvil means and at such a transverse relationship to said sheet receiving and aligning means as to assure that pivotal movement of said arm from the first position to the second position will move said anvil means and said sheet receiving and aligning means toward said blade so that the blade will sever the plastic sheet, when carried in said sheet receiving and aligning means, at an angle and simultaneously establish a beveled margin at the severed edge.

10. A device of claim 9 including means for visibly locating said plastic sheet within said sheet receiving and aligning means in relation to said anvil means and said cutting blade.

11. A device for severing a plastic sheet of predetermined width and indeterminate length to produce a backing strip of any desired length with beveled margins at the peripheral edges thereof, said device comprising:

a horizontal base member;

a pair of horizontally spaced support members projecting vertically upwardly from said base member;

a generally horizontal beam member interconnecting said support members remote from said base member and establishing an opening bounded by the base, beam and support members;

an arm passing lengthwise through said opening;

means journaling said arm in said support members for pivotal movement between first and second positions;

a channel extending lengthwise along the uppermost surface of said arm and having a width capable of receiving a length of the plastic sheet and aligning said length along the length of said arm; and a cutting blade fixed in the beam member, said blade projecting downwardly at an angle to the vertical and extending transversely of said channel such that pivotal movement of the arm from said first position to said second position will move a portion of said channel toward said blade and the blade will sever the plastic sheet, when carried in the channel, at an angle and simultaneously establish a beveled margin at the severed edge.

12. A device of claim 11 including an aperture in said beam member aligned with the angle of said cutting blade for permitting sighting along the blade and visual location of said plastic sheet within said channel in relation to the cutting blade.

13. A device of claim 11 including means biasing said arm toward said first position.

14. A device of claim 11 wherein said base, support and beam members comprise a first unitary structure of molded synthtic resin and said arm and channel comprise a second unitary structure of molded synthetic resin.

References Cited by the Examiner

UNITED STATES PATENTS

| | | | |
|---|---|---|---|
| 180,614 | 8/1876 | McGregor | 83—581 |
| 425,587 | 8/1890 | Sholes | 83—568 X |
| 676,781 | 8/1901 | Stimpson | 83—581 |
| 984,054 | 2/1911 | Werner et al. | 83—568 |
| 2,801,471 | 8/1957 | Richardson | 83—568 X |
| 3,041,908 | 7/1962 | Dubats | 83—570 X |
| 3,118,680 | 1/1964 | Lynch | 83—570 X |

WILLIAM W. DYER, JR., *Primary Examiner.*

J. M. MEISTER, *Assistant Examiner.*